(12) United States Patent
Murata

(10) Patent No.: US 10,483,885 B1
(45) Date of Patent: Nov. 19, 2019

(54) METHODS AND APPARATUS FOR ROTATION DETECTION OF A BRUSHED DC MOTOR

(71) Applicant: SEMICONDUCTOR COMPONENTS INDUSTRIES, LLC, Phoenix, AZ (US)

(72) Inventor: Tsutomu Murata, Mizuho (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/050,220

(22) Filed: Jul. 31, 2018

(51) Int. Cl.
*H02P 7/29* (2016.01)

(52) U.S. Cl.
CPC .................. *H02P 7/2913* (2013.01)

(58) Field of Classification Search
CPC ...................................................... H02P 7/2913
USPC .......................................................... 388/811
See application file for complete search history.

(56) References Cited

U.S. PATENT DOCUMENTS

| 2006/0017412 | A1 | 1/2006 | Sasaya |
| 2006/0208722 | A1 | 9/2006 | Takemasa |
| 2008/0298784 | A1 | 12/2008 | Kastner |

*Primary Examiner* — Erick D Glass
(74) *Attorney, Agent, or Firm* — The Noblitt Group, PLLC; Hettie L. Haines

(57) ABSTRACT

Various embodiments of the present technology comprise a method and apparatus for rotation detection of a brushed DC motor. The method and apparatus may detect switching of the commutators and utilize signals indicative of switching to determine speed and/or rotation information of the motor. In one embodiment, the apparatus comprises an ADC, a difference circuit, an absolute value circuit, and a comparator connected in series with each other.

20 Claims, 3 Drawing Sheets

US 10,483,885 B1

METHODS AND APPARATUS FOR ROTATION DETECTION OF A BRUSHED DC MOTOR

BACKGROUND OF THE TECHNOLOGY

Brushed DC motors are used in a variety of applications, such as in an automobile. In an automobile application, the brushed DC motors may be used to control the position of side mirrors, the up/down position and control of windows, the position of the seat, the optical axis of the headlights, and the like. Accordingly, it is desired to detect rotation information of the motor to improve performance of the motor and/or provide improved motor control.

SUMMARY OF THE INVENTION

Various embodiments of the present technology comprise a method and apparatus for rotation detection of a brushed DC motor. The method and apparatus may detect switching of the commutators and utilize signals indicative of switching to determine speed and/or rotation information of the motor. In one embodiment, the apparatus comprises an ADC, a difference circuit, an absolute value circuit, and a comparator connected in series with each other.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various motors, micro controllers, drive circuits, amplifiers, signal converters, comparators, and the like, which may carry out a variety of functions. In addition, the present technology may be practiced in conjunction with any number of systems, such as automation, robotics, computer numerical control (CNC) machinery, and the like, and the systems described are merely exemplary applications for the technology.

Figure 1:
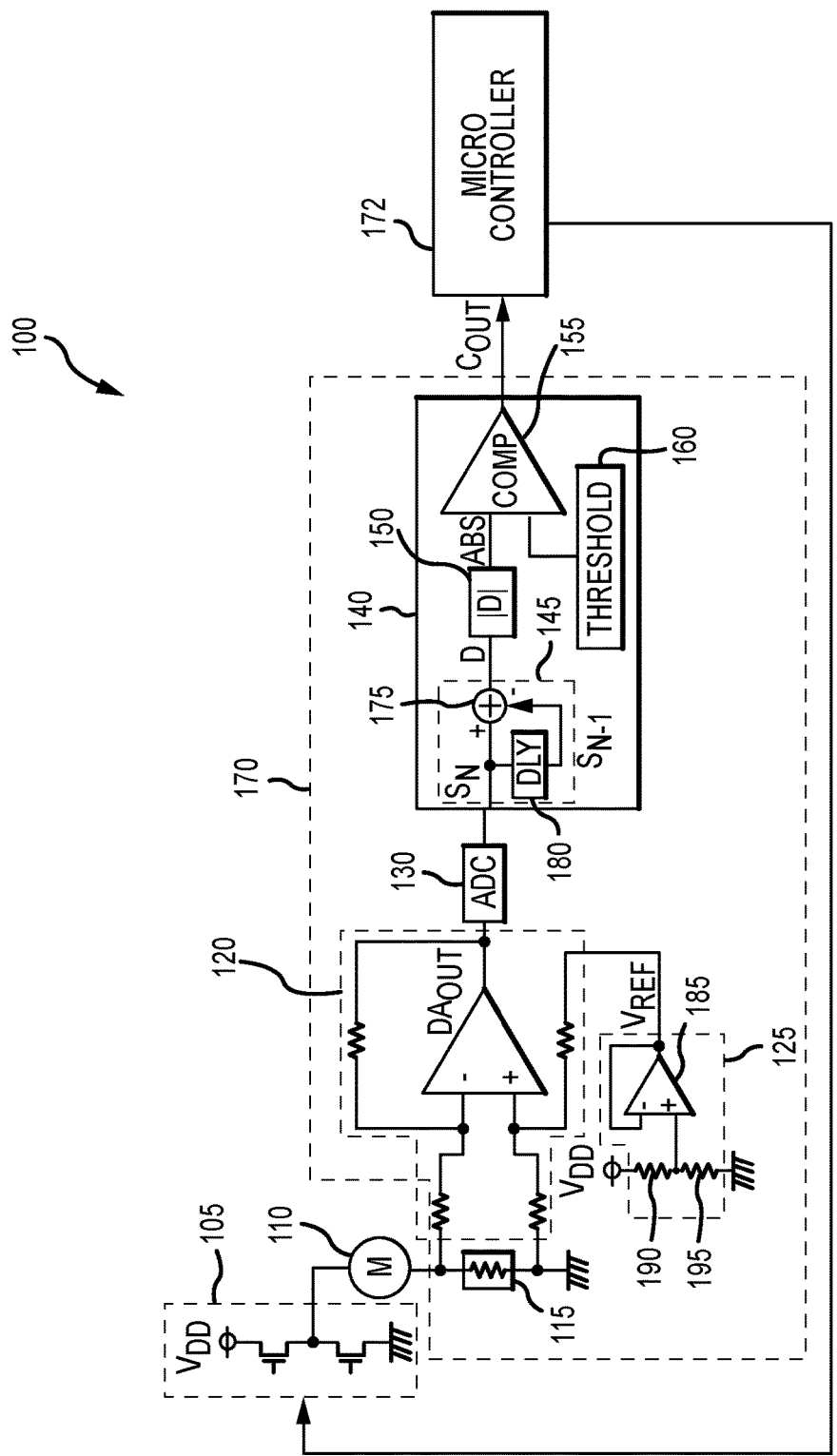
FIG. 1 is a block diagram of a brushed DC motor system in accordance with an exemplary embodiment of the present technology.

Methods and apparatus for rotation detection of a brushed DC motor according to various aspects of the present technology may operate in conjunction with any suitable system, such as an automotive system. Referring to FIG. 1, an exemplary brushed DC motor system 100 may be incorporated into an automobile system where a high level of precision and versatility are desired. For example, in an exemplary embodiment, the brushed DC motor system 100 may comprise a drive circuit 105, a motor 110, a detection circuit 170, and microcontroller 172, that operate together to detect rotation information of the motor 110.

The drive circuit 105 is configured to drive and/or control the motor 110 according to an applied voltage and/or a supply voltage $V_{DD}$. For example, the drive circuit 105 may be connected to and configured to receive a feedback signal from the microcontroller 172, such as a signal related to a rotary position of the motor 110 and/or a direction of rotation of the motor 110. The drive circuit 105 may control the speed of the motor 110 and/or change the direction of rotation of the motor 110 in response to the feedback signal from the microcontroller 172. For example, at least one terminal of the motor 110 may be connected to the drive circuit 105. The drive circuit 105 may comprise any circuit suitable for driving the operation of the motor 110. In an exemplary embodiment, the drive circuit 105 may comprise a plurality of transistors connected in series, each responsive to the applied voltage and/or the supply voltage $V_{DD}$, wherein one terminal of the motor 110 is connected to the drive circuit 105.

In an alternative embodiment, the drive circuit 105 may be connected to two terminals of the motor 110. In the present case, the drive circuit 105 may comprise a plurality of series-connected transistors, wherein the plurality of series-connected transistors are connected in parallel with each other.

The motor 110 is responsive to the drive circuit 105 and may change its rotary position according to the drive circuit 105. In an exemplary embodiment, and referring to FIG. 3, the motor 110 comprises a brushed DC motor. For example, the motor 110 comprises: a plurality of stator magnets 320, 325; a rotor 300 comprising a plurality of magnetic poles 305, 310, 315 and a plurality of commutator segments 330, 335, 340 (collectively referred to as a commutator); and a plurality of brushes 360, 370. The plurality of magnetic poles 305, 310, 315 are connected to a shaft 350 configured to rotate. The commutator segments 330, 335, 340 are disposed circumferentially at equal intervals on an outer surface of the shaft 350. The brushes 360, 370 are positioned on both sides of the shaft 350 and opposite each other. Each of the brushes 360, 370 are further positioned to contact one of the commutator segments. As the rotor 300 rotates, the contact positions between the brushes 360, 370 and the commutator segments 330, 335, 340 change in sequence.

Referring back to FIG. 1, the detection circuit 170 detects a current $I_M$ through the motor 110 and generates rotation information of the motor 110 according to the motor current $I_M$. For example, the detection circuit 170 may be connected to the motor 110 and configured to measure and/or detect various operational specifications of the motor 110, such as current, voltage, and the like. The detection circuit 170 may generate a final output signal $C_{OUT}$ that represents rotation information of the motor 110 and transmit the final output signal $C_{OUT}$ to the microcontroller 172. The detection circuit 170 may comprise various systems and/or circuits that operate together to generate rotation information. For example, the detection circuit 170 may comprise a differential amplifier 120, a reference voltage generator circuit 125, an analog-to-digital circuit (ADC) 130, and a digital circuit 140.

The differential amplifier 120 generates a differential output $DA_{OUT}$ that represents an amplified difference of two inputs. For example, the differential amplifier 120 comprises an inverting terminal (−) configured to receive a first input and a non-inverting terminal (+) configured to receive a second input. Accordingly, the differential output $DA_{OUT}$ is the difference of the first and second inputs at the inverting and non-inverting terminals, respectively. According to an exemplary embodiment, the differential amplifier 120 is connected to the motor 110 and operates in conjunction with a sense resistor 115 to measure the motor current $I_M$. For example, the input terminals of the differential amplifier 120 are connected to a first end and a second end of the sense resistor 115 to detect a voltage drop across the sense resistor 115, wherein the voltage drop across the sense resistor 115 is proportional to the motor current $I_M$. Accordingly, the differential output $DA_{OUT}$ is proportional to the motor current $I_M$.

According to an exemplary embodiment, the sense resistor 115 is further connected to the motor 110 at the first end and a reference potential, such as a ground potential, at the second end.

The reference voltage generator circuit 125 generates a reference voltage $V_{REF}$. The reference voltage generator circuit 125 may be configured to supply the reference voltage $V_{REF}$ to the differential amplifier 120. For example, the reference voltage generator circuit 125 may be connected to the non-inverting terminal (+) of the differential amplifier 120. The reference voltage generator circuit 125 may comprise any circuit suitable for generating a reference voltage. In an exemplary embodiment, the reference voltage generator circuit 125 may comprise a plurality of resistors 190, 195 connected in series and an operational amplifier 185 connected to the series-connected resistors 190, 195. The reference voltage generator circuit 125 may be further connected to the supply voltage $V_{DD}$ and the ground.

The ADC 130 converts an analog signal into a digital signal and generates an ADC output $S_N$ (where N is a sample number). In an exemplary embodiment, the ADC 130 is connected to an output terminal of the differential amplifier 120 and configured to receive the differential output $DA_{OUT}$. The ADC 130 converts the differential output $DA_{OUT}$ to a digital signal. The ADC 130 may comprise any suitable signal converter and the particular ADC architecture may be selected according to a particular application or desired output. The ADC 130 may transmit the ADC output $S_N$ to the digital circuit 140 for further processing.

The digital circuit 140 performs various computations on an input signal and generates a digital output signal. For example, the digital circuit 140 may be connected to an output terminal of the ADC 130 and receive the ADC output $S_N$ as an input and perform difference computations, absolute value computations, comparisons, and the like. According to an exemplary embodiment, the digital circuit 140 may comprise a difference circuit 145, an absolute value circuit 150, and a comparator circuit 155 connected in series with each other. The digital output signal of the detection circuit 140 may correspond to the final output signal $C_{OUT}$, wherein the digital output signal (e.g., the final output signal $C_{OUT}$ is transmitted to the microcontroller 172.

The difference circuit 145 is configured to compute a difference of two input values. For example, the difference circuit 145 may be connected to the ADC 130 and receive the ADC output $S_N$. According to an exemplary embodiment, the difference circuit 145 may be configured to compute a difference of a current ADC output (e.g., $S_N$) and a previous ADC output (e.g., $S_{N-1}$). For example, the difference circuit 145 may comprise an arithmetic circuit 175, such as a circuit to perform addition/subtraction, configured to add/subtract the previous ADC output $S_{N-1}$ from the current ADC output $S_N$ and generate a difference signal D according to the addition/subtraction. According to an exemplary embodiment, the difference circuit 145 may further comprise a delay register 180 connected to the arithmetic circuit 175 and configured to store the previous ADC output $S_{N-1}$ and transmit the previous ADC output $S_{N-1}$ to the arithmetic circuit 175. The difference circuit 145 may be configured to transmit the difference signal D to the absolute value circuit 150.

The absolute value circuit 150 is configured to receive an input value and generate an output that represents an absolute value of the input value. For example, the absolute value circuit 150 may be connected to an output terminal of the difference circuit 145 and configured to receive the difference signal D, compute an absolute value of the difference signal D (|D|), and output the absolute value ABS (i.e., |D|). The absolute value circuit 150 may comprise any suitable device or circuit for performing an absolute value calculation.

The comparator 155 compares two input values and generates an output according to the comparison. For example, the comparator 155 may comprise a first input terminal connected to the absolute value circuit 150 and configured to receive the absolute value ABS and a second input connected to a register 160 configured to store a predetermined threshold value. The predetermined threshold value may be selected according to the particular specifications of the motor 110, such as a known signal level indicative of switching from one commutator segment to a different commutator segment. The comparator 155 may compare the absolute value ABS with the predetermined threshold value and generate an output signal (i.e., $C_{OUT}$) according to whether the predetermined threshold value is less than or greater than the absolute value ABS. For example, if the absolute value ABS is greater than the predetermined threshold value, then the comparator 155 outputs a HIGH signal (e.g., a digital 1 or voltage greater than 0) and if the absolute value ABS is less than the predetermined threshold value, then the comparator 155 outputs a LOW signal (e.g., a digital 0 or voltage equal to 0). Accordingly, in an output waveform of the comparator 155, the HIGH signals are represented as pulses. The comparator 155 may comprise any circuit element and/or a logic device suitable for performing comparisons of two signals. The output signal $C_{OUT}$ of the comparator 155 corresponds to rotation information, and may further correspond to the final output signal of the detection circuit 170.

The microcontroller 172 receives various input signals, such as rotation information, and makes decisions according to the various input signals. For example, the microcontroller 172 may receive the final output signal $C_{OUT}$ from the detection circuit 170. According an exemplary embodiment, the microcontroller 172 may be configured to receive the final output signal $C_{OUT}$ and utilize the signal to determine a speed of the motor 110, number of rotations of the motor 110, and the like. For example, the microcontroller 172 may be configured to measure a time duration between each pulse in the final output signal $C_{OUT}$ to determine the speed of the motor 110 and count the number of pulses of the final output signal $C_{OUT}$ to determine the number of times the motor 110 rotates. The higher the time duration between each pulse, the slower the motor 110 and vice versa. Additionally, the number of rotations and number of pulses are related to the total number of commutators. For example, in an exemplary embodiment where the motor 110 comprises three (3) commutators, 7 pulses (or 6 slots between the pulses) correspond to one full rotation of the motor 110.

According to an exemplary embodiment, the microcontroller 172 is further connected to the drive circuit 105, wherein the microcontroller 172 transmits various control signals, such as the feedback signal, to the drive circuit 105 to control the speed and/or the direction of rotation of the motor 110. The particular feedback signal may be selected according to a desired operation, the motor specifications, the particular motor application, and the like.

Figure 2:
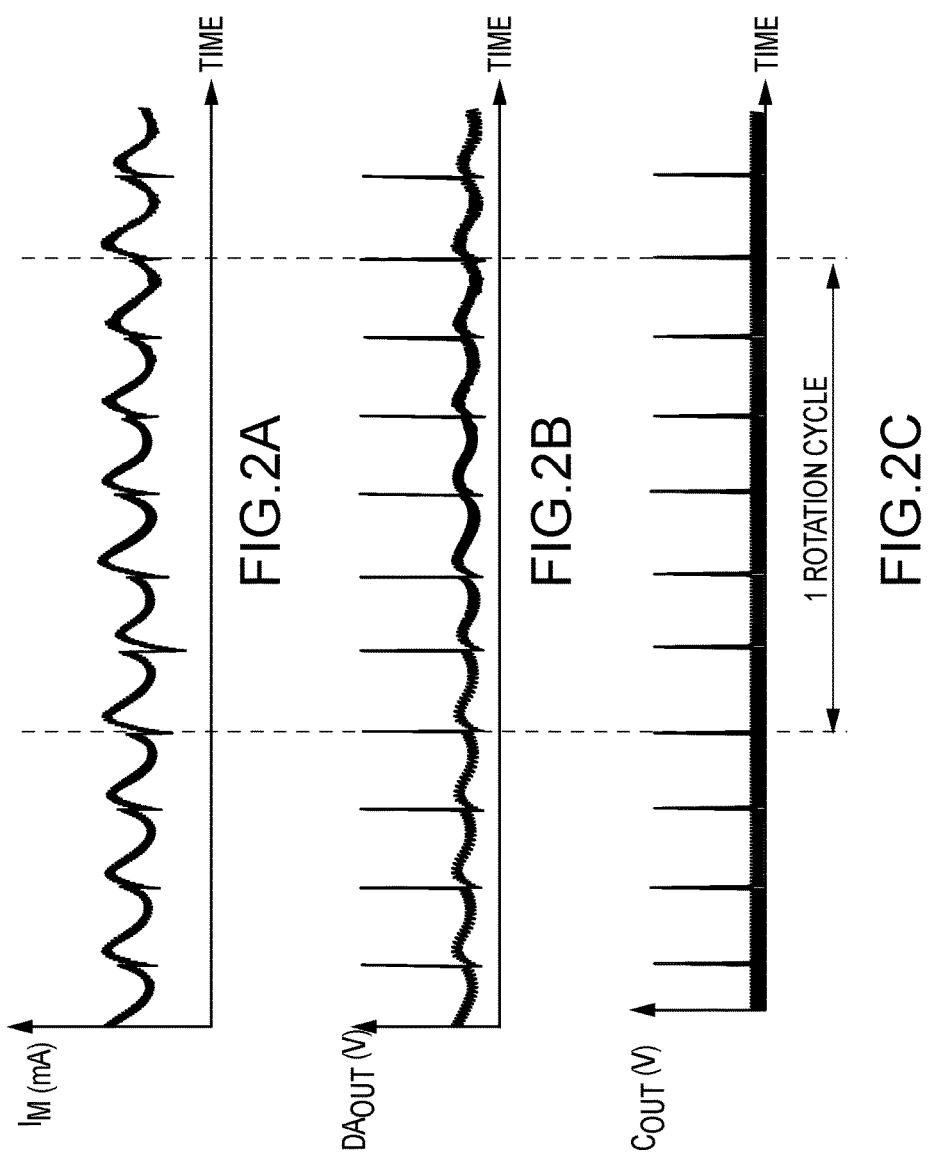
FIG. 2A is a motor current waveform in accordance with an exemplary embodiment of the present technology.
FIG. 2B is an output waveform of a differential amplifier in accordance with an exemplary embodiment of the present technology.
FIG. 2C is an output waveform of a comparator in accordance with an exemplary embodiment of the present technology.
Figure 3:
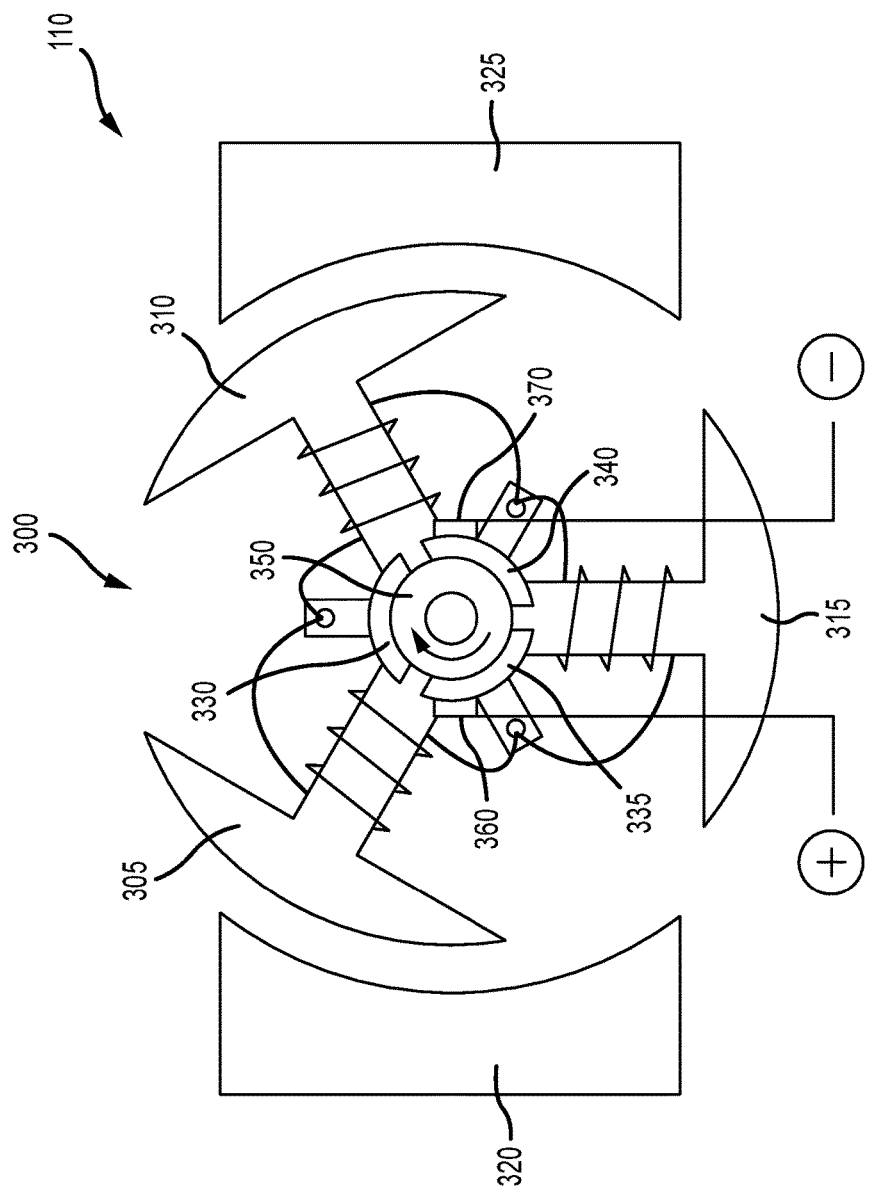
FIG. 3 representatively illustrates a brushed DC motor in accordance with an exemplary embodiment of the present technology.

In operation, and referring to FIGS. 1-3, as the motor 110 rotates, each brush 360, 370 sequentially contacts one commutator at a time. However, when each brush 360, 370 switches from one commutator to the next, discontinuous points may be observed in a motor current waveform (FIG. 2A) due to gaps that exist between each commutator. The discontinuous points may be detected with the differential amplifier 120 and appear as spikes that coincide with the discontinuous points (FIG. 2B). After converting the differential output $DA_{OUT}$ to a digital value and processing the digital value with the difference circuit 145 and the absolute value circuit 150, the comparator outputs a waveform (FIG. 2C) that also precisely coincides with the discontinuous points in the motor current $I_M$. Accordingly, since the discontinuous points in the motor current waveform indicate the switching of the commutators, the microcontroller 172 may utilize the comparator output waveform to determine the speed of the motor 110 and/or the number of rotations of the motor 110 over a particular period of time. For example, the microcontroller 172 may count the time elapsed between each pulse in the comparator output waveform (FIG. 2C) and/or count the number of pulses within a predetermined period of time. The microcontroller 172 may analyze the pulse and timing relationship to determine the speed and/or number of rotations of the motor 110.

According to an automobile application, the speed and/or rotation information of the motor 110 may be related to a distance that the motor 110 moves a seat, the length of time it takes the motor 110 to move a side mirror, and the like.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A detection circuit connected to a brushed DC motor, comprising:
    a differential amplifier configured to detect a current of the brushed DC motor and generate an analog signal that is proportional to the current;
    an analog-to-digital converter (ADC) connected to the differential amplifier and configured to convert the analog signal to a first digital signal; and
    a digital circuit connected to the ADC and comprising:
        a difference circuit configured to:
            receive the first digital signal; and
            compute a second digital signal, wherein the second digital signal is the difference of the first digital signal and a previous first digital signal;
        an absolute value circuit connected to the difference circuit and configured to compute an absolute value of the second digital signal; and
        a comparator circuit connected to the absolute value circuit and configured to:
            compare the computed absolute value with a predetermined threshold value; and
            generate a comparator output according to the comparison.

2. The circuit according to claim 1, further comprising a reference voltage generator circuit connected to a non-inverting terminal of the differential amplifier and configured to generate a reference voltage.

3. The circuit according to claim 2, wherein the reference voltage generator circuit comprises:

a first resistor connected in series with a second resistor; and an operational amplifier connected to the first and second resistors.

4. The circuit according to claim 1, wherein the difference circuit further comprises a delay register configured to store the previous first digital signal.

5. The circuit according to claim 1, wherein the digital circuit further comprises a register connected to the comparator and configured to store the predetermined threshold value.

6. The circuit according to claim 1, further comprising a sense resistor comprising a first end and a second end; and wherein:

the first end is connected to the brushed DC motor and an inverting terminal of the differential amplifier; and the second end is connected to a non-inverting terminal of the differential amplifier and a ground.

7. The circuit according to claim 1, wherein the comparator circuit generates a HIGH comparator output if the computed absolute value is greater than the predetermined threshold value.

8. The circuit according to claim 7, wherein the comparator circuit generates a LOW comparator output if the computed absolute value is less than the predetermined threshold value.

9. The circuit according to claim 7, wherein the HIGH comparator output represents switching contact of a brush from one commutator to a different commutator.

10. The circuit according to claim 1, wherein the predetermined threshold value is selected according to a signal level indicative of switching of the brushed DC motor.

11. A method for detecting rotation information of a brushed DC motor having a plurality of commutators, comprising:

detecting a current of the brushed DC motor;

generating an analog signal that is proportional to the detected current;

converting the analog signal to a first digital signal;

computing a second digital signal, wherein the second digital signal is a difference of the first digital signal and a previous first digital signal;

computing an absolute value of the second digital signal;

comparing the computed absolute value with a predetermined threshold value; and generating an output according to the comparison, wherein the output represents switching from one commutator of the brushed DC motor to a different commutator.

12. The method according to claim 11, further comprising analyzing the output to determine a speed of the brushed DC motor.

13. The method according to claim 11, further comprising analyzing the output to determine a total number of rotations of the brushed DC motor during a time period.

14. A brushed DC motor system, comprising:

a drive circuit;

a brushed DC motor connected to and controlled by the drive circuit, wherein the brushed DC motor comprises a plurality of commutators;

a detection circuit connected to the brushed DC motor and comprising:

a differential amplifier configured to detect a current of the brushed DC motor and generate an analog signal that is proportional to the current;

an analog-to-digital converter (ADC) connected to the differential amplifier and configured to convert the analog signal to a first digital signal;

a difference circuit comprising:

an arithmetic circuit configured to:

receive the first digital signal; and compute a second digital signal, wherein the second digital signal is the difference of the first digital signal and a previous first digital signal;

a register connected to the arithmetic circuit and configured to store the previous digital signal;

an absolute value circuit connected to the difference circuit and configured to compute an absolute value of the second digital signal; and a comparator circuit connected to the absolute value circuit at a first terminal and configured to:

compare the computed absolute value with a predetermined threshold value; and generate a comparator output according to the comparison; and a microcontroller connected to the detection circuit and configured to analyze the comparator output to determine at least one of:

a speed of the brushed DC motor; and a total number of rotations of the brushed DC motor during a time period.

15. The brushed DC motor system according to claim 14, wherein the comparator circuit generates a HIGH comparator output if the computed absolute value is greater than the predetermined threshold value.

16. The brushed DC motor system according to claim 15, wherein the comparator circuit generates a LOW comparator output if the computed absolute value is less than the predetermined threshold value.

17. The brushed DC motor system according to claim 15, wherein the HIGH comparator output represents switching contact of a brush from a first commutator from the plurality of commutators to a second commutator from the plurality of commutators.

18. The brushed DC motor system according to claim 14, further comprising a reference voltage generator circuit connected to a non-inverting terminal of the differential amplifier and comprising:

a first resistor connected in series with a second resistor; and an operational amplifier connected to the first and second resistors.

19. The brushed DC motor system according to claim 14, wherein the predetermined threshold value is selected according to a signal level indicative of switching of the brushed DC motor.

20. The brushed DC motor system according to claim 14, wherein the microcontroller is further connected to the drive circuit and configured to supply a feedback signal to the drive circuit, wherein the feedback signal controls at least one of: a speed and a direction of rotation of the brushed DC motor.

* * * * *